United States Patent
Bolding et al.

(10) Patent No.: US 9,070,024 B2
(45) Date of Patent: Jun. 30, 2015

(54) INTELLIGENT BIOMETRIC IDENTIFICATION OF A PARTICIPANT ASSOCIATED WITH A MEDIA RECORDING

(75) Inventors: Michael J. Bolding, Smyrna, GA (US); Vanessa P. Reyes, McDonough, GA (US); Janki Y. Vora, Dallas, TX (US); Joe C. Wallace, College Park, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 382 days.

(21) Appl. No.: 13/555,456

(22) Filed: Jul. 23, 2012

(65) Prior Publication Data
US 2014/0023246 A1  Jan. 23, 2014

(51) Int. Cl.
G06K 9/00 (2006.01)
H04N 1/00 (2006.01)
H04N 1/32 (2006.01)
H04N 101/00 (2006.01)

(52) U.S. Cl.
CPC ........ G06K 9/00885 (2013.01); H04N 1/00326 (2013.01); H04N 1/32128 (2013.01); H04N 2101/00 (2013.01); H04N 2201/0084 (2013.01); H04N 2201/3274 (2013.01); H04N 2201/3205 (2013.01)

(58) Field of Classification Search
None
See application file for complete search history.

(56) References Cited

U.S. PATENT DOCUMENTS

| 6,433,818 | B1 | 8/2002 | Steinberg et al. | |
| 6,877,134 | B1 | 4/2005 | Fuller et al. | |
| 7,694,885 | B1 | 4/2010 | Bourdev | |
| 2003/0204736 | A1 | 10/2003 | Garrison et al. | |
| 2006/0074986 | A1* | 4/2006 | Mallalieu et al. | 707/104.1 |
| 2009/0102947 | A1 | 4/2009 | Ou | |
| 2009/0122198 | A1* | 5/2009 | Thorn | 348/715 |
| 2010/0198919 | A1 | 8/2010 | Vora et al. | |
| 2011/0044512 | A1 | 2/2011 | Bambha et al. | |

(Continued)

FOREIGN PATENT DOCUMENTS

| CA | 2626323 A1 | 10/2009 |
| CN | 201315007 Y | 9/2009 |
| JP | 2002218389 A | 8/2002 |

(Continued)

OTHER PUBLICATIONS

Paul A. Blythe, Sr., "Biometric Authentication System for Secure Digital Cameras," Dissertation, Binghamton Univ., State Univ. of New York, 2005.

*Primary Examiner* — Barry Drennan
(74) *Attorney, Agent, or Firm* — Patents on Demand P.A.; Brian K. Buchheit; Scott M. Garrett (57) ABSTRACT

A media recording within a data store of a computing device can be identified. The media can be a photograph or a video. The media can be analyzed to determine a participant associated with the media. The participant can be a creator or a subject. The identity of the participant can be determined utilizing biometrics associated with an identity source. The identity can be associated with a confidence score which can indicate the accuracy of the identity. The identity source can be associated with a weighted value which can represent the validity of identity data associated with the source. The identity of the participant can be automatically tagged within the media. The tagging can be a participant name or participant user name.

20 Claims, 3 Drawing Sheets

(56) References Cited

U.S. PATENT DOCUMENTS

2011/0135152 A1* 6/2011 Kashiwagi .................... 382/103
2011/0243449 A1* 10/2011 Hannuksela et al. ......... 382/190
2013/0101220 A1* 4/2013 Bosworth et al. ............ 382/195

FOREIGN PATENT DOCUMENTS

| JP | 2003219253 A | 7/2003 |
| JP | 2005244769 A | 9/2005 |
| WO | 9827509 A1 | 6/1998 |

* cited by examiner

INTELLIGENT BIOMETRIC IDENTIFICATION OF A PARTICIPANT ASSOCIATED WITH A MEDIA RECORDING

BACKGROUND

The present invention relates to the field of biometric identification and, more particularly, to intelligent biometric identification of a participant associated with a media recording.

Media recording capabilities within digital devices have become ubiquitous allowing users to capture photographs and/or videos anytime and anywhere. Increasingly, media such as photos and videos are being shared with friends, family, and co-workers. For example, immediately after Bob takes a picture of Mary and Todd, he can subsequently share the photograph with Mary, Todd, and Bob's friend, Dave. Consequently, establishing appropriate credit to participants (e.g., the media creator, subjects) is becoming a greater challenge. For example, upon receiving the photograph of Mary and Todd, Dave can be unaware of who took the photograph unless he asks who captured the photograph. The challenge is further compounded when multiple users share the same digital devices to record photographs and/or videos since there is no authoring data associated with the media. For example, when two users capture video on a camcorder, determining which videos belong to which user can be difficult to establish.

Additionally, many digital devices permit the recording of media on removable data mediums (e.g., Secure Digital card) which can be physically shared between users. As the data medium is shared, users can often forget who owned the medium and consequently who recorded the media on the medium. One approach often used is utilizing editing software to add the creator's name. This approach can be time consuming especially when there are substantial quantities of media and/or many different users. Further, due to the time consuming nature of this approach, many users often choose not to perform this step. When users do choose to perform this approach, the time lapsed between the media recording and the use of the editing software can add difficulty to remembering the media creator's identify.

BRIEF SUMMARY

One aspect of the present invention can include a system, an apparatus, a computer program product, and a method for intelligent biometric identification of a participant associated with a media recording. A media recording within a data store of a computing device can be identified. The media can be a photograph or a video. The media can be analyzed to determine a participant associated with the media. The participant can be a creator or a subject. The identity of the participant can be determined utilizing biometrics associated with an identity source. The identity can be associated with a confidence score which can indicate the accuracy of the identity. The identity source can be associated with a weighted value which can represent the validity of identity data associated with the source. The identity of the participant can be automatically tagged within the media. The tagging can be a participant name or participant user name.

Another aspect of the present invention can include an apparatus, a computer program product, a method, and a system for intelligent biometric identification of a participant associated with a media recording. An identification engine can be configured to determine the identity of a participant associated with a media recording. The media can be at least one of a photograph and a video. A data store can be configured to persist at least one of a media. A participant identity can be associated with the media, a tagging rule, and an identity source identifier.

DETAILED DESCRIPTION

The present disclosure is a solution for intelligent biometric identification of a participant associated with a media recording. In the solution, participant identification can be achieved utilizing biometric techniques, permitting automated identification of media creator and subjects within the media. In one embodiment, an algorithm can be used to assigning confidence score to the mapping of the participant identities as a form of metadata associated with the media. Participant identities can be determined through the use of one or more sources which can be manually and/or automatically weighted. Sources can include a local database (e.g., on a media recorder) and/or remote repositories (e.g., FACEBOOK). The weighting can affect the confidence score associated with the participant identity. For example, when a participant is identified by a source with a high weighting, the confidence score can be high. It should be appreciated that the disclosure can leverage a learning functionality permitting increasingly accurate results for participant identification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
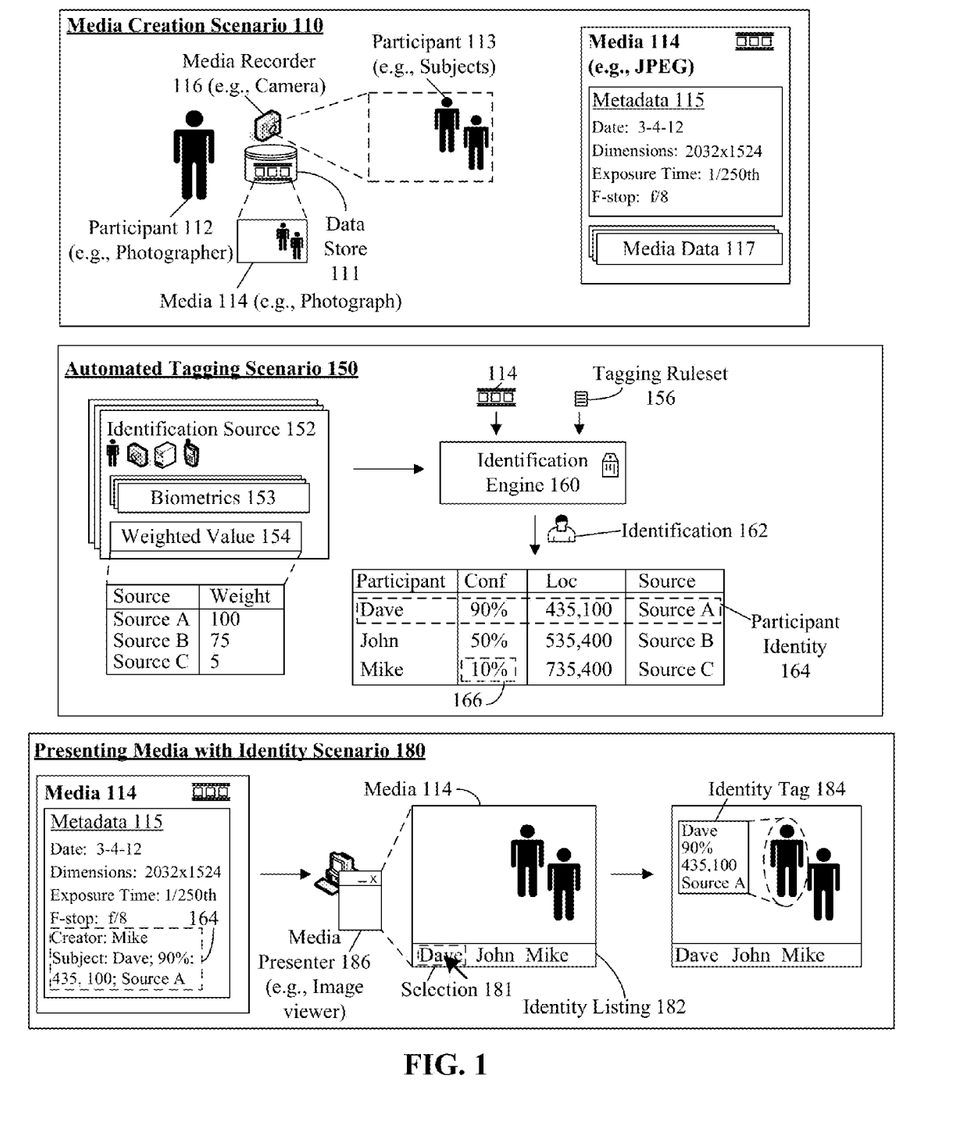
FIG. 1 is a schematic diagram illustrating a scenario for intelligent biometric identification of a participant associated with a media recording in accordance with an embodiment of the inventive arrangements disclosed herein.

FIG. 1 is a schematic diagram illustrating a scenario 110, 150, 180 for intelligent biometric identification of a participant associated with a media recording in accordance with an embodiment of the inventive arrangements disclosed herein. Scenario 110, 150, 180 can be present in the context of method 200, and/or system 300. It should be appreciated that one or more scenarios 110, 150, 180 can be optionally omitted permitting the functionality of the disclosure is retained. In scenario 110, a participant 112 (e.g., photographer) can utilize media recorder 116 (e.g., camera) to create a media 114 (e.g., photograph) associated with participant 113. For example, participant 112 can photograph participant 113 using a digital camera. The media 114 can be persisted within a data store 111 associated with media recorder 116. For example, data store can be an internal memory storage (e.g., flash memory) of a camera able to store pictures. Participant 112, 113 identity associated with media 114 can be automatically determined via biometrics 152 utilizing an identity source 152. The identity 164 can be associated with a confidence score which can indicate the accuracy of the identity. The identity 164 of the participant 112, 113 can be persisted within metadata 115 of media 114 which can be presented within media presenter 186. For example, a video recorder can automatically identify people within a video during playback.

As used herein, biometrics 153 can include, but is not limited to, a fingerprint, a voiceprint, a retina scan, a facial recognition mapping, a user profile and the like. Biometrics 153 can be automatically and/or manually provided via identity source 152. In one instance, media recorder 116 can be equipped with biometric collecting hardware/software including, but not limited to, a fingerprint reader, a voiceprint acquisition component (e.g., microphone), a facial image recorder (e.g., camera), a skin sensor detector, and the like.

As used herein, media 114 can be a digital artifact recorded by media recorder 116 associated with participant 112. Media 114 can include, but is not limited to, an image, a video, an augmented reality graphics, and the like. Media 114 can conform to a Joint Photographic Experts Group (JPEG), a Tagged Image File Format (TIFF), a Portable Network Graphic (PNG), an Motion Picture Expert Group (MPEG), an Audio Video Interleave (AVI), and the like. Media 114 can include media data 117, metadata 115, and the like. Metadata 115 can include, but is not limited to, a timestamp, a media recorder setting, an Exchangeable Image File Format (EXIF) data, and the like. Media recorder 116 can be an electronic device able to record media 114 associated with participant 112. Recorder 116 can include, but is not limited to, a digital camera, a video camera, a mobile phone, a tablet, an audio recorder, a computer, a laptop, and the like.

In scenario 110, a participant 112 can utilize a media recorder 116 to record a media 114. The participant 112 can be a media creator (e.g., photographer) able to interact with media recorder 116. Participant 113 can be a subject (e.g., people) which can be associated with the media 114 (e.g., photograph). It should be appreciated that media 114 can be a traditional and/or proprietary format. Data store 111 can include, Random Access Memory (RAM), Read Only Memory (ROM), and the like. In one instance, recorder 116 can store profiles of frequent users which can be utilized to identify the media 114 creator during media creation. For example, a thumbprint obtained from participant 112 when the shutter release is pressed can be utilized to determine participant identity. In another instance, biometrics can be manually inputted at media creation.

In one embodiment, recorder 116 can obtain identity 164 utilizing a proximate computing device. In the embodiment, on creation of media 114, recorder 116 can communicate with a proximate device to determine participant 112, 113 identity. For example, a camera can communicate with a nearby smartphone (e.g., via BLUETOOTH) to determine participant identity via analyzing a user profile of the phone. That is, the disclosure can permit identification to occur locally on the recorder 116 where the media 114 can be locally stored. It should be appreciated that the disclosure is not limited to the communication described herein. Presence information including, but not limited to, GPS data, orientation information, elevation data, and the like can be utilized in obtaining biometrics and/or determining participant identity.

In automated tagging scenario 150, an identification engine 160 can utilize an biometrics 153 and tagging ruleset 156 to identify participant 112, 113 of media 114. In the scenario 150, engine 160 can create identification 162 which can include participant identity 164 utilizing biometrics 153 obtained from identification source 152. Identity 164 can include, but is not limited to, a name, a confidence score, a region mapping, source identifier, and the like. For example, identity 164 can include the name of a participant and the participant location within the frame of a picture. In one instance, participant identity 164 can be persisted within metadata 115 of media 114. Identification source 152 can be associated with a weighted value 154. For example, weighted value 154 associated with a Source A can be a percentage value such as one hundred percent. The value 154 can be utilized to determine the amount source 152 data can affect identification 162 outcome. For example, biometrics obtained from source B having a weighting of seventy five can affect the outcome of identification 162 more than the biometrics obtained from source C having a weighting of five. Weighted value 154 can include numeric values, complex values, non-numeric values, and the like.

In one embodiment, a user can specify a weighting value 154 (e.g., a percentage) associated with each source 152 which can be used for data mining. The weighting value 154 can be applied to future attempts at identification of media 114. In one instance, biometrics from multiple sources can be aggregated to form a participant identity 164.

Engine 160 can utilize tagging ruleset 156 to perform identification 162 to determine a participant identity 164. Based on the value 154, a confidence score (e.g., score 166) can be computed for a participant 112, 114 identity. That is confidence score can be utilized to indicate the accuracy of participant identity 164. In one instance, the score can be computed utilizing an average of weighted values of each source. In another instance, the confidence score can be computed by a complex statistical algorithm. It should be appreciated that confidence score can be arbitrarily complex. In one instance, score can be one of a series of qualitative values such as Low, Medium, and High. In another instance, the score can be a numerical range such as one to one hundred.

In scenario 180, identity 164 obtained from scenario 150 can be persisted within metadata 114. Identity 164 can be presented simultaneously with media 114 within a media presenter 186 as identity listing 182. It should be appreciated that identity listing 182 can be an optional feature of the disclosure. For example, an image viewer can present a photograph and an identity listing 182 within a screen. In one instance, identity listing 182 can permit selection 181 of individual participants associated with the media 114. In the instance, identity tag 184 can be presented simultaneously with media 114. For example, tag 184 can indicate the participant's identity is Dave, the accuracy of the identity is ninety percent, the region of the image identified as Dave is (435, 100), and the identity is obtained from a source Source A. In one instance, identity tag 184 can be presented when a cursor is positioned over a region of the media. For example, tag 184 can be presented in response to a mouseover event.

Drawings presented herein are for illustrative purposes only and should not be construed to limit the invention in any regard. It should be appreciated that the disclosure can support participant identification within video. In one instance, each video keyframe can be analyzed to determine participant presence. In the instance, participant identity can be established when participant is present. It should be appreciated that the disclosure can leverage artificial intelligence algorithms to perform functionality described herein.

Figure 2:
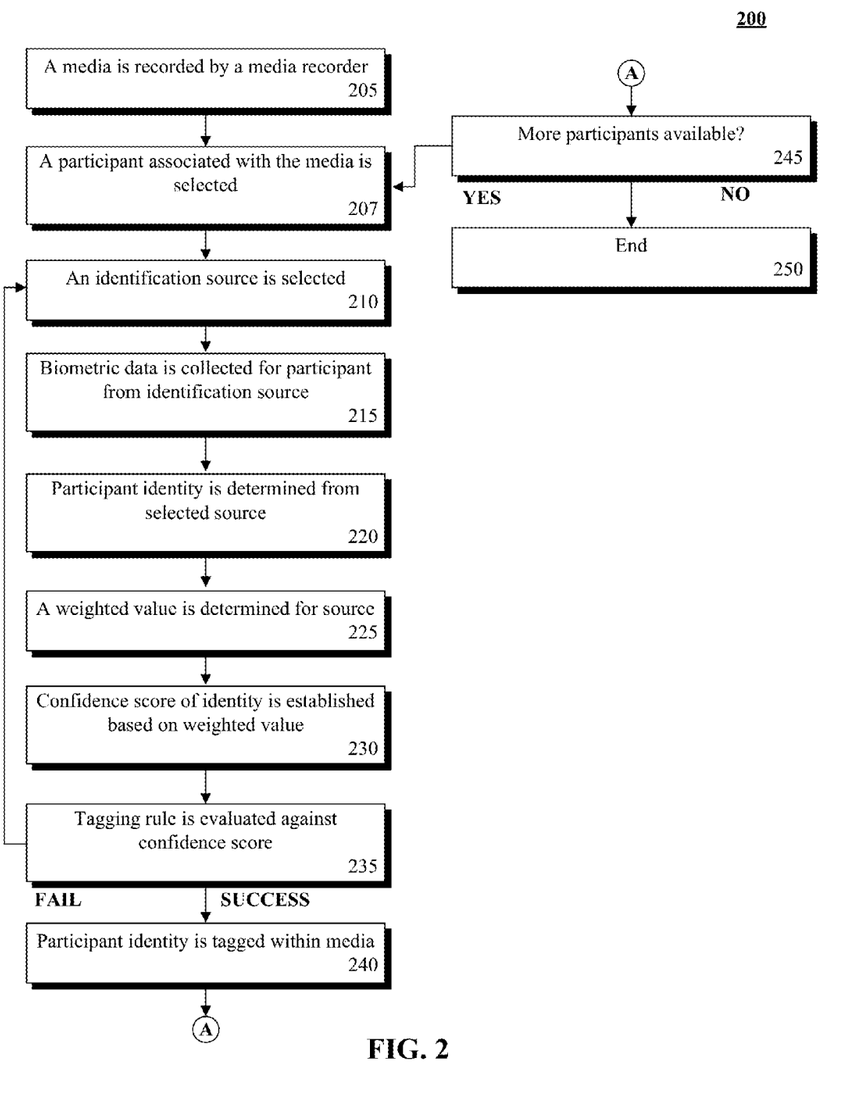
FIG. 2 is a schematic diagram illustrating a method for intelligent biometric identification of a participant associated with a media recording in accordance with an embodiment of the inventive arrangements disclosed herein.

FIG. 2 is a schematic diagram illustrating a method 200 for intelligent biometric identification of a participant associated with a media recording in accordance with an embodiment of the inventive arrangements disclosed herein. Method 200 can be presented in the context of scenario 100, 150, 180 and/or system 300. In method 200, a participant associated with the media can be automatically tagged within the media. The participant identity can be determined using an identity source. The identity source can include a weighted value which can be used to generate a confidence score. The confidence score can be associated with the participant identity.

In step 205, a media can be recorded by a media recorder. The media recorder can record the media in real-time or near real-time. In step 207, a participant associated with the media can be determined and selected. For example, feature analysis can be performed to determine a quantity of people present in an image. In step 210, an identification source can be selected. The source can be selected based on weighted value order, numerical order, alphabetical order, random order, and the like. Source selection can be intelligently chosen based on weighted value. For example, remote sources can have a lower weighting than local sources which can facilitate the prioritization of local sources. In step 215, a biometric data can be collected for the participant from the identification source. In step 220, a participant identity can be determined from a selected source. It should be appreciated that traditional and/or proprietary mechanisms for determining participant identity utilizing biometrics can be leveraged. In one instance, biometrics from a selected source can be matched against the selected participant. For example, a facial recognition match can be performed against a person within a picture. In step 225, a weighted value can be determined for the source. If the source has no weighted value, a default value can be assigned based on one or more user and/or system defined parameters. In step 230, a confidence score of identity can be established based on weighted value. In step 235, if a tagging rule can be evaluated against the confidence score is a success, the method can continue to step 240, else return to step 210. In one instance, steps 210-235 can be run for each identification source. In another instance, steps 210-235 can be performed until the confidence score is equivalent to a threshold value. In step 240, a participant identity can be tagged within the media. In step 245, if more participants are available, the method can return to step 245, else continue to step 250. In step 250, the method can end.

Drawings presented herein are for illustrative purposes only and should not be construed to limit the invention in any regard. Method 200 can be performed in serial or in parallel. In one instance, method 200 can be a functionality of a Web-enabled service. It should be appreciated that steps 207-245 can be repeatedly performed for each participant associated with the media. In one instance, method 200 can determine participants not relevant (e.g., strangers) to the media and/or participants. For example, friends of a video creator appearing in the foreground of the video can be selected for identification while persons in the background can be ignored.

Figure 3:
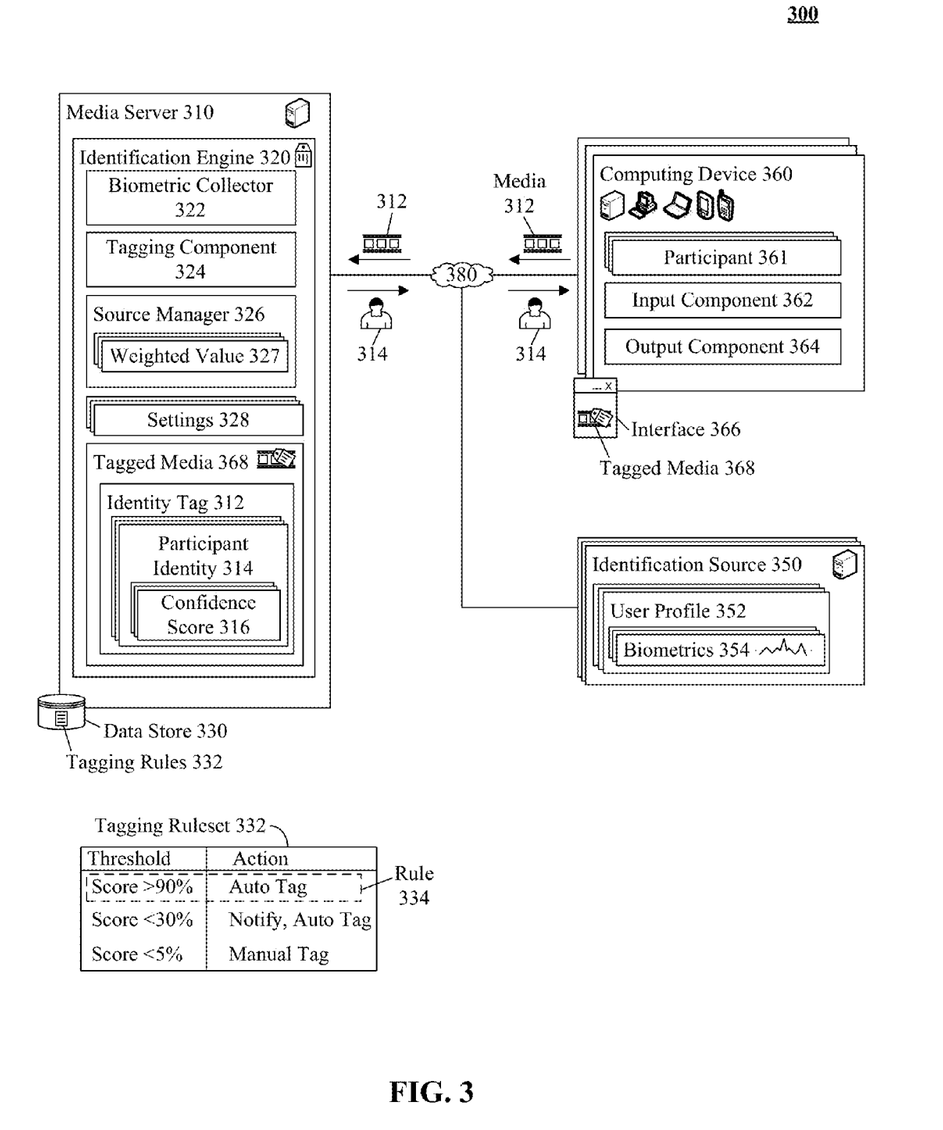
FIG. 3 is a schematic diagram illustrating a system for intelligent biometric identification of a participant associated with a media recording in accordance with an embodiment of the inventive arrangements disclosed herein.

FIG. 3 is a schematic diagram illustrating a system 300 for intelligent biometric identification of a participant associated with a media recording in accordance with an embodiment of the inventive arrangements disclosed herein. System 300 can be present in the context of scenario 110, 150, 180, and/or method 200. In system 300, an identification engine 320 can leverage biometrics 354 to automatically determine participant 361 identity (e.g., participant identity 314). Media 312 obtained from device 360 can be analyzed to determine participants 361 associated with the media. Engine 321 can utilize user profile biometrics to determine participant identity 314. Participant identity can be conveyed to device 360 which can present media within interface 366 as tagged media 368. System 300 components can be communicatively linked via one or more networks 380. In one configuration of system 300, engine 320 can provide identification services to computing device 360. In the configuration, media 312 can be communicated to engine 320 and engine 320 can respond with identity 314. In another configuration, media 312 can be communicated to engine 320 and engine 320 can convey tagged media 368 to device 360.

Identification engine 320 can be a hardware/software element configured to determine participant 361 identity based on biometrics 354. Engine 320 functionality can include, but is not limited to, device 360 management, rule 332 management, data store 330 communication, and the like. Engine 320 can extracts attributes which are weighed and prioritized by configurable algorithms and databases. The attributes can produce metadata for the media 312 content to automatically identify the media creator and tagging information with an associated confidence level. In one embodiment, engine 320 can include learning capabilities which can improve the accuracy of identification within tag 312. In one instance, engine 320 can be a networked computing element. In one embodiment, engine 320 can be a functionality of a device 360 firmware. In another embodiment, engine 320 functionality can be present within a Web-enabled service. In yet another embodiment, engine 320 can be a component of a facial recognition system.

In one instance, engine 320 can be utilized to automatically digitally sign media upon creation. In another instance, engine 320 can be used to identify subjects (e.g., people, pets) within a media.

Biometric collector 322 can be a hardware/software component able to aggregate biometrics 354 associated with participant identity 314. Collector 322 functionality can include, but is not limited to, biometric identification, biometric verification, and the like. In one embodiment, collector 322 can retrieve biometrics 354 from user profile 352 of source 350. In the embodiment, collector 322 can parse traditional and/or proprietary format profiles to obtain biometrics 354. In another embodiment, collector 322 can permit selection of biometrics by biometric type. For example, collector 322 can be utilized to restrict participant identity generation using fingerprint biometrics only.

Tagging component 324 can be a hardware/software element configured to associate a participant identity 314 with a participant. Component 324 functionality can include, but is not limited to, confidence score computation, tagged media 368 creation, tag 312 creation, tag 312 presentation, and the like. In one embodiment, confidence score 316 can be computed utilizing one or more statistical algorithms. For example, confidence score 316 can be an average of the weighted value 327 associated with each identity source. In one embodiment, component 324 can be utilized to notify a user when the participant identity is uncertain (e.g., low confidence score). In the embodiment, a notification can be communicated to a user permitting manual tagging of the participant. In one configuration of the embodiment, the notification can include a list of suggested participant identities. Responsive to a user selection of a suggest identity, the component 324 can improve the accuracy of subsequent determinations.

Source manager 326 can be a hardware/software component able to handle identification source 350. Manager 326 functionality can include, source 350 registration, profile 352 format determination, biometric 354 detection, weighting value determination, and the like. Manager 326 can establish weighted value 327 based on biometrics 354 accuracy, profile 352 accuracy, source 350 availability, and the like. It should be understood that manager 326 can dynamically adjust weighted value 327 to reflect changes in biometrics 354. For example, when a voiceprint is added to a user profile, the weighted value 327 can be increased to indicate biometrics associated with the profile is available.

Settings 328 can be one or more options configured to establish the behavior of system 300, media server 310, and/or engine 320. Settings 328 can include, but is not limited to, biometric collector 322 settings, tagging component 324 options, source manager 326 settings, rules 332, and the like. Settings 328 can enable user customization of engine 320 behavior. Settings 328 can enable user specification configurations, preferences, and learned behaviors. Settings 328 can be automatically and/or manually established. In one instance, settings 328 can be persisted within data store 330.

Tagged media 368 can be a media 312 associated with a participant identity 314. In one instance, tagged media 368 can include a digital signature associated with a media 314 creator. In another instance, tagged media 368 can include a link to participant identity 314 information which can be persisted outside the media 368. For example, when participant identity 314 information exceeds a size threshold (e.g., ten kilobytes), the identity 314 can be stored in a communicatively linked data store.

Data store 330 can be a hardware/software component able to persist tagging rules, participant identity 314, settings 328, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to server 310 in one or more traditional and/or proprietary mechanisms. In one instance, data store 330 can be a component of Structured Query Language (SQL) complaint database.

Tagging ruleset 332 can be one or more rules for establishing participant identity 314 associated with participant 361. Ruleset 332 can include, but is not limited to, a threshold value, an action, and the like. For example, rule 334 can include a confidence score threshold value which when exceeded can result in a participant identity automatically associated with the media 312. It should be appreciated rules 332 can be arbitrarily complex and can be manually and/or automatically generated. In one instance, tagging ruleset 332 can include presentation rules for tag 312. In the instance, ruleset 332 can be utilized to personalize each tag 312 associated with an participant 361. That is, each tag 312 can be uniquely shaded coded based on participant 361 preferences. For example, the tag 312 associated with the creator of the media 312 can be colored red, friends of the creator can be colored green, and strangers can be colored yellow.

Computing device 350 can be a hardware/software entity permitting the creation of media 312. Device 350 can include, but is not limited to, input component 362, output component 364, controls, and the like. Output component 362 can include, but is not limited to, a display, an interface 366, a printer, and the like. Input component 364 can include, but is not limited to, a keyboard, a touchscreen, a stylus, a push button, and the like. Controls can include, but is not limited to, playback controls, recording controls, display controls, and the like. Computing device 350 can be communicatively linked with interface 366. In one instance, when tag 312 data exceeds allotted screen space of interface 366, an abbreviated tag can be presented. In the instance, interface 366 can be utilized to inspect tag 312. For example, an abbreviated tag 312 can be presented with media 368 which can include a participant name and selection of tag 312 can present additional information on a different screen.

Source 350 can be a hardware/software component able to persist user profile 352. Source 350 can be an internal data store (e.g., memory of device 360), an external data store (e.g., Compact Flash card), a communicatively linked data store (e.g., Internet database), and the like. Source 350 can be a database record, a file (e.g., profile), a social network (e.g., LINKEDIN), and the like. User profile 352 can be an automatically and/or manually established data set associated with participant 361. For example, profile 352 can be a camera user profile including owner information. Profile 352 can include biometrics 354 which can be automatically and/or manually provided. In one instance, biometrics 354 can include soft biometrics such as height, hair characteristic, and the like.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), VPN and the like.

Drawings presented herein are for illustrative purposes only and should not be construed to limit the invention in any regard. One or more components of engine 320 can be present and/or optionally omitted permitting the functionality of the engine 320 is retained. It should be appreciated that one or more components of engine 320 can be combined and/or separated based on functionality, usage, and the like. In one instance, system 300 can conform to a Service Oriented Architecture (SOA). In one embodiment, system 300 can include a remote client permitting communication between device 360 and engine 320. In the embodiment, the client can stream the media content along with content for identification facilitate communication between an external biometric device and device 360.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identifying participants of a media comprising:
    identifying a media recording within a data store of a computing device, wherein the media is at least one of a photograph and a video;
    analyzing the media to determine a participant associated with the media, wherein the participant is a creator of the media;
    determining the identity of the participant utilizing biometrics associated with an identity source, wherein the identity is associated with a confidence score, wherein the confidence score indicates the accuracy of the identity associated with the participant, wherein identity source is associated with a weighted value, wherein the weighted value represents the validity of identity data associated with the source, wherein the confidence score is computed utilizing an average of weighted values of the each of the one or more identity sources; and
    automatically tagging the identity of the participant within the media, wherein the tagging is at least one of a participant name and participant user name.

2. The method of claim 1 further comprising:
    presenting the identity of the participant within the media, wherein the presenting is performed by a media viewer.

3. The method of claim 1, wherein the identity of the participant is stored within metadata associated with the participant.

4. The method of claim 3, wherein the metadata includes a region of the media associated with the participant identity.

5. The method of claim 1, wherein the confidence score is at least one of a relative and absolute value.

6. The method of claim 1, wherein the weighted value of the identity source is manually or automatically assigned.

7. The method of claim 3, wherein the metadata conforms to an Exchangeable Image File Format (EXIF) standard.

8. The method of claim 1, wherein the identity of the participant is determined utilizing facial recognition technology.

9. The method of claim 1, wherein the biometrics is a fingerprint.

10. The method of claim 1, wherein the identity of the participant is determined by a user profile associated with a social network.

11. A system for identifying a participant of a media comprising:
    an identification engine configured to identify a participant associated with a media recording, wherein the media is at least one of a photograph and a video, wherein the participant is at least one of a creator of the media and a subject present within the media;
    a biometric collector configured to determine an identity of the participant utilizing biometrics associated with one or more identity sources, wherein the identity is associated with a confidence score, wherein the confidence score indicates the accuracy of the identity associated with the participant, wherein each of the one or more identity sources is associated with a weighted value, wherein the weighted value represents validity of identity data of the identity source, wherein the confidence score is computed utilizing an average of weighted values of the each of the one or more identity sources; and
a data store configured to persist at least one of the media, the participant identity associated with the media, a tagging rule, and an identity source identifier.

12. The system of claim 11, further comprising:
a tagging component configured to automatically tag the identity of the participant within the media, wherein the tagging is at least one of a participant name and a participant user name; and
a source manager configured to programmatically adjust the weighted value associated with the identity source responsive to identification accuracy feedback.

13. The system of claim 11, wherein the tagging rules is associated with a tagging action.

14. The system of claim 11, further comprising:
a notification component able to present a plurality of user selectable participant identities.

15. The system of claim 11, wherein the identity of the participant is persisted within metadata of the media, wherein the metadata conforms to an Exchangeable Image File Format (EXIF) standard.

16. The method of claim 11, wherein the identity of the participant is determined utilizing facial recognition technology.

17. The method of claim 11, wherein the biometrics is at least one of a fingerprint and a voiceprint.

18. The system of claim 11, wherein the identification accuracy feedback is a user feedback.

19. A computer program product comprising a computer readable storage medium having computer usable program code embodied therewith, wherein said computer usable program code when processed by a processor is operable to:
identify a media recording within a data store of a computing device, wherein the media is at least one of a photograph and a video;
analyze the media to determine a participant associated with the media, wherein the participant is a creator of the media and a subject present within the media;
determine the identity of the participant utilizing biometrics associated with one or more identity sources, wherein the identity is associated with a confidence score, wherein the confidence score indicates the accuracy of the identity associated with the participant, wherein each of the one or more identity sources is associated with a weighted value, wherein the weighted value represents the validity of identity data associated with the identity source, wherein the confidence score is computed utilizing an average of weighted values of the each of the one or more identity sources; and
automatically tag the identity of the participant within the media, wherein the tagging is at least one of a participant name and participant user name.

20. The computer program product of claim 19, wherein said computer usable program code when processed by a processor is further operable to:
present the identity of the participant within the media, wherein the presenting is performed by a media viewer associated with the computer program product.

* * * * *